United States Patent
Kim

(10) Patent No.: US 10,163,210 B2
(45) Date of Patent: Dec. 25, 2018

(54) IMAGE SENSOR AND CAMERA MODULE

(71) Applicant: SAMSUNG ELECTRO-MECHANICS CO., LTD., Suwon-si (KR)

(72) Inventor: Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/264,674

(22) Filed: Sep. 14, 2016

(65) Prior Publication Data

US 2017/0186163 A1    Jun. 29, 2017

(30) Foreign Application Priority Data

Dec. 24, 2015    (KR) .................. 10-2015-0186493

(51) Int. Cl.
| | |
|---|---|
| G06F 11/00 | (2006.01) |
| G06T 7/00 | (2017.01) |
| H04N 5/225 | (2006.01) |
| H04N 9/04 | (2006.01) |

(52) U.S. Cl.
CPC .......... *G06T 7/0018* (2013.01); *G06T 7/0024* (2013.01); *H04N 5/2258* (2013.01); *H04N 9/045* (2013.01); *H04N 2209/049* (2013.01)

(58) Field of Classification Search
CPC . H04N 9/045; H04N 5/2258; H04N 2209/049
USPC ......................................................... 726/24
See application file for complete search history.

(56) References Cited

U.S. PATENT DOCUMENTS

| | | | |
|---|---|---|---|
| 8,115,825 B2 | 2/2012 | Culbert et al. | |
| 2008/0278608 A1 | 11/2008 | Kim et al. | |
| 2009/0135245 A1* | 5/2009 | Luo ................ | A61B 1/041 |
| | | | 348/36 |
| 2012/0268566 A1* | 10/2012 | Kim ................ | H04N 5/3696 |
| | | | 348/46 |

FOREIGN PATENT DOCUMENTS

| | | |
|---|---|---|
| KR | 10-2008-0098880 A | 11/2008 |
| KR | 10-2012-0137432 A | 12/2012 |
| KR | 10-2013-0006503 A | 1/2013 |
| KR | 10-2015-0078054 A | 8/2016 |
| WO | WO 2011/127077 A1 | 10/2011 |
| WO | WO 2011/127078 A1 | 10/2011 |
| WO | WO 2015/001519 A2 | 1/2015 |

OTHER PUBLICATIONS

Korean Office Action dated Nov. 28, 2016 in corresponding Korean patent application No. 10-2015-0186493 (11 pages with English translation).

* cited by examiner

*Primary Examiner* — Mohammad W Reza
(74) *Attorney, Agent, or Firm* — NSIP Law

(57) ABSTRACT

An image sensor includes a substrate and a plurality of image sensor pixel arrays configured to obtain images having different characteristics. The plurality of image sensor pixel arrays are disposed in a row and spaced apart from one another by a predetermined distance on one surface of the substrate.

7 Claims, 13 Drawing Sheets

IMAGE SENSOR AND CAMERA MODULE

CROSS-REFERENCE TO RELATED APPLICATIONS

This application claims the benefit under 35 USC 119(a) of Korean Patent Application No. 10-2015-0186493 filed on Dec. 24, 2015, in the Korean Intellectual Property Office, the entire disclosure of which is incorporated herein by reference for all purposes.

BACKGROUND

1. Field

This application relates to an image sensor and a camera module.

2. Description of Related Art

Recently, the market for mobile devices such as mobile phones and tablet PCs has grown rapidly. One technical factor driving this rapid market growth is the increased sizes of display devices and larger numbers of pixels therein. The increases in the size of display devices and the numbers of pixels included therein allow consumers to enjoy high quality image content viewed on larger screens, and leads to the acceleration of the popularization of smartphones.

As the number of pixels included in smartphone displays has increased, there have also been improvements in rear-facing image pickup camera modules in smartphones. Recently, high-resolution auto-focus cameras have become standard in smartphones, and an installation rate of optical image stabilizer (OIS) cameras has also gradually increased.

In spite of the improvements in smartphone cameras, there are problems in that images may lack brightness when captured in low light level conditions, and a large amount of noise may be present in an image due to a reduction in an image pixel size and a shortage of gray level expression in a backlight situation, and demand for improvements thereof have increased. Also, when a subject is imaged at a distance in a magnified manner using a digital zoom function, resolution may be significantly reduced compared to using an optical zoom function.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image sensor includes a substrate; and a plurality of image sensor pixel arrays configured to obtain images having different characteristics; and the plurality of image sensor pixel arrays may be disposed in a row and spaced apart from one another by a predetermined distance on one surface of the substrate.

The plurality of image sensor pixel arrays may include a first image sensor pixel array configured to obtain a black-and-white image; and a second image sensor pixel array configured to obtain a color image.

The plurality of image sensor pixel arrays may include a first image sensor pixel array configured to obtain an image from a lens having a first angle of view; and a second image sensor pixel array configured to obtain an image from a lens having a second angle of view wider than the first angle of view.

The plurality of image sensor pixel arrays may include a first image sensor pixel array, a second image sensor pixel array, and a third image sensor pixel array; the second image sensor pixel array and the third image sensor pixel array may be disposed on opposite sides of the first image sensor pixel array; the first image sensor pixel array may be configured to obtain an image from a main camera lens; the second image sensor pixel array may be configured to obtain an image from a first sub-camera lens; and the third image sensor pixel array may be configured to obtain an image from a second sub-camera lens.

The main camera lens may be an auto-focus lens; the first sub-camera lens may be an auto-focus lens having a same focal length and a same angle of view as the main camera lens; and the second sub-camera lens may be a telephoto lens having a focal length longer than a focal length of the main camera lens and an angle of view narrower than an angle of view of the main camera lens.

The main camera lens may be an optical image stabilization (OIS) auto-focus lens, the first sub-camera lens may be an auto-focus lens, and the second sub-camera lens may be an optical image stabilization (OIS) lens or an auto-focus lens.

The plurality of image sensor pixel arrays may include a first image sensor pixel array, a second image sensor pixel array, and a third image sensor pixel array; the first image sensor pixel array and the second image sensor pixel array may be disposed on opposite sides of the third image sensor pixel array; the first image sensor pixel array may be configured to obtain an image from a main camera lens; the second image sensor pixel array may be configured to obtain an image from a first sub-camera lens; and the third image sensor pixel array may be configured to obtain an image from a second sub-camera lens.

The main camera lens may be an auto-focus lens; the first sub-camera lens may be an auto-focus lens having a same focal length and a same angle of view as the main camera lens; and the second sub-camera lens may be a telephoto lens having a focal length longer than a focal length of the main camera lens and an angle of view narrower than an angle of view of the main camera lens.

The main camera lens may be an optical image stabilization (OIS) auto-focus lens, the first sub-camera lens may be an auto-focus lens, and the second sub-camera lens may be an optical image stabilization (OIS) lens or an auto-focus lens.

The image sensor may further include a signal processor disposed on the one surface of the substrate and configured to process images obtained from the plurality of image sensor pixel arrays.

The signal processor may include a plurality of analog signal processors configured to convert analog signals from respective ones of the plurality of image sensor pixel arrays into respective digital signals; and a digital signal processor configured to synchronize the digital signals.

The digital signal processor may be further configured to adjust a line synchronization and a frame synchronization of a corresponding image sensor pixel array of each of the plurality of analog signal processors to synchronize the digital signals to obtain synchronized images from the plurality of image sensor pixel arrays; and the digital signal processor may include a distance detector configured to detect distance information from the synchronized images of the plurality of image sensor pixel arrays.

The image sensor may further include another substrate disposed on another surface of the substrate; and a signal processor configured to process images obtained from the plurality of image sensor pixel arrays; and the signal processor may include a plurality of analog signal processors disposed on the one surface of the substrate and configured to convert analog signals from respective ones of the plurality of image sensor pixel arrays into respective digital signals; and a digital signal processor disposed on an exposed surface of the other substrate and configured to synchronize the digital signals; the digital signal processor may be further configured to adjust respective line synchronizations and frame synchronizations of the image sensor pixel arrays of the plurality of analog signal processors to coincide with each other to synchronize the digital signals to obtain synchronized images from the plurality of image sensor pixel arrays; and the digital signal processor may include a distance detector configured to detect distance information from the synchronized images of the plurality of image sensor pixel arrays.

In another general aspect, a camera module includes an image sensor including a first image sensor pixel array, a second image sensor pixel array, and a third image sensor pixel array disposed in a row on one surface of a substrate; and a lens module including a first lens assembly configured to concentrate light on the first image sensor pixel array; a second lens assembly configured to concentrate light on the second image sensor pixel array; and a third lens assembly configured to concentrate light on the third image sensor pixel array.

The second image sensor pixel array and the third image sensor pixel array may be disposed on opposite sides of the first image sensor pixel array; the first lens assembly may be a lens assembly for a main camera; the second lens assembly may be a lens assembly for a first sub-camera; and the third lens assembly may be a lens assembly for a second sub-camera.

The first lens assembly may be an auto-focus lens assembly; the second lens assembly may be an auto-focus lens assembly having a same focal length and a same angle of view as the first lens assembly; and the third lens assembly may be a telephoto lens assembly having a focal length longer than a focal length of the first lens assembly and an angle of view narrower than an angle of view of the first lens assembly.

The first lens assembly may be an optical image stabilization (OIS) auto-focus lens assembly, the second lens assembly may be an auto-focus lens, and the third lens assembly may be an optical image stabilization (OIS) lens or an auto-focus lens.

The first image sensor pixel array and the second image sensor pixel array may be disposed on opposite sides of the third image sensor pixel array; the first lens assembly may be a lens assembly for a main camera; the second lens assembly may be a lens assembly for a first sub-camera; and the third lens assembly may be a lens assembly for a second sub-camera.

The first lens assembly may be an auto-focus lens assembly; the second lens assembly may be an auto-focus lens assembly having a same focal length and a same angle of view as the first lens assembly; and the third lens assembly may be a telephoto lens assembly having a focal length longer than a focal length of the first lens assembly and an angle of view narrower than an angle of view of the first lens assembly.

The first lens assembly may be an optical image stabilization (OIS) auto-focus lens assembly, the second lens assembly may be an auto-focus lens, and the third lens assembly may be an optical image stabilization (OIS) lens or an auto-focus lens.

The image sensor may further include a signal processor disposed on the one surface of the substrate and configured to process images obtained from the first image sensor pixel array, the second image sensor pixel array, and the third image sensor pixel array; and the signal processor may include a first analog signal processor configured to convert a first analog signal from the first image sensor pixel array into a first digital signal; a second analog signal processor configured to convert a second analog signal from the second image sensor pixel array into second digital signal; a third analog signal processor configured to convert a third analog signal from the third image sensor pixel array into a third digital signal; and a digital signal processor configured to synchronize the first, second, and third digital signals.

The image sensor may further include another substrate disposed on another surface of the substrate; and a signal processor configured to process images obtained from the first to third image sensor pixel arrays; and the signal processor may include a first analog signal processor disposed on the one surface of the substrate and configured to convert a first analog signal from the first image sensor pixel array into a first digital signal; a second analog signal processor disposed on the one surface of the substrate and configured to convert a second analog signal from the second image sensor pixel array into second digital signal; a third analog signal processor disposed on the one surface of the substrate and configured to convert a third analog signal from the third image sensor pixel array into a third digital signal; and a digital signal processor disposed on an exposed surface of the other substrate and configured to synchronize the first, second, and third digital signals.

In another general aspect, a camera module includes a substrate; cameras disposed on the substrate; and a signal processor configured to align images obtained from the cameras based on a configuration of the cameras on the substrate.

The cameras may be configured to obtain images having different characteristics.

The cameras may include a main camera including a first lens having an auto-focus function or both an optical image stabilization (OIS) function and an auto-focus function; a first sub-camera including a second lens having an auto-focus function and having a same focal length as the first lens; and a second sub-camera including a third lens having a focal length that may be longer than a focal length of the first lens and the focal length of the second lens.

The main camera may further include a first image sensor pixel array; the first sub-camera may further include a second image sensor pixel array having a same number of pixels and a same image pixel sensor size as the first image sensor pixel array; and the second sub-camera may further include a third image sensor pixel array having fewer pixels than the first image sensor pixel array and the second image sensor pixel array and a same image sensor pixel size as the first image sensor pixel array and the second image sensor pixel array, or having a same number of pixels as the first image sensor pixel array and the second image sensor pixel array and a smaller image sensor pixel size than the first image sensor pixel array and the second image sensor pixel array.

The signal processor may include a memory storing calibration values representing differences in rotation and position between the cameras; and the signal processor may be further configured to align the images obtained from the cameras based on the calibration values.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
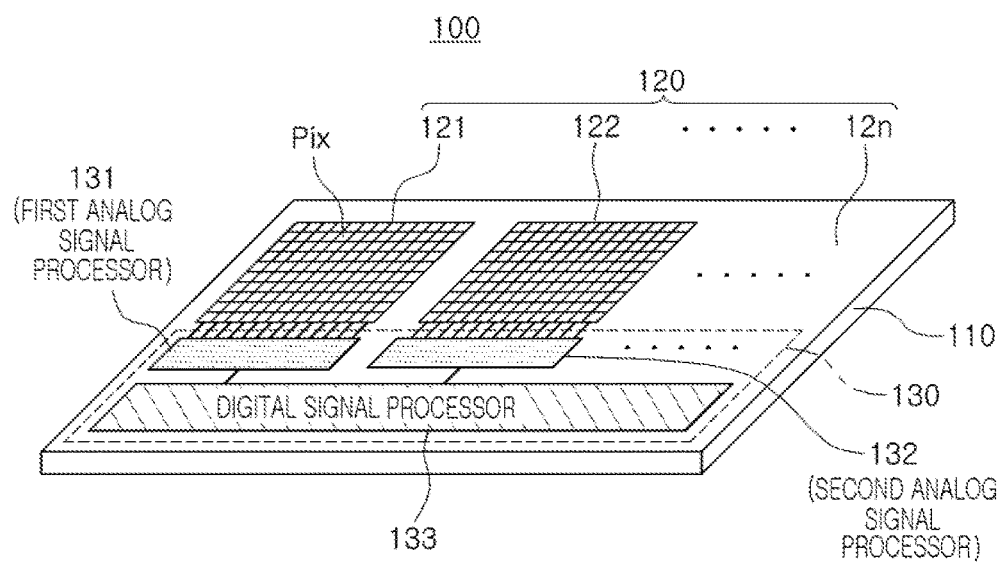
FIG. 1 is a perspective view schematically illustrating an example of an image sensor.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples herein. Rather, the examples described herein have been provided so that this disclosure will be thorough and complete, and will convey the full scope of the disclosure to one of ordinary skill in the art.

Throughout the specification, when an element, such as a layer, region, or wafer (substrate), is described as being "on," "connected to," or "coupled to" another element, it can be directly "on," "connected to," or "coupled to" the other element, or there may be other elements intervening therebetween. In contrast, when an element is referred to as being "directly on," "directly connected to," or "directly coupled to" another element, there can be no elements or layers intervening therebetween. The term "and/or" includes any and all combinations of one or more of the associated listed items.

Although terms such as "first," "second," and "third" may be used herein to describe various members, components, regions, layers, and/or sections, these members, components, regions, layers, and/or sections are not to be limited by these terms. Rather, these terms are only used to distinguish one member, component, region, layer, or section from another member, component, region, layer, or section. Thus, a first member, component, region, layer, or section referred to in an example below could also be termed a second member, component, region, layer, or section without departing from the teachings of the example.

Spatially relative terms, such as "above," "upper," "below," and "lower," may be used herein for ease of description to describe one element's relationship to another element as shown in the figures. Such spatially relative terms are intended to encompass different orientations of the device in use or operation in addition to the orientation depicted in the figures. For example, if the device in the figures is turned over, elements described as "above" or "upper" relative to other elements would then be oriented "below" or "lower" relative to the other elements. Thus, the term "above" can encompass both the above and below orientations depending on a particular direction of the figures. The device may be otherwise oriented (rotated 90 degrees or at other orientations), and the spatially relative terms used herein are to be interpreted accordingly.

The terminology used herein is for describing particular examples only, and is not intended to limit the disclosure. The terms "a," "an," and "the" include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations in the shapes of regions shown in the drawings may occur. Thus, the examples described below are not to be construed as being limited to the particular shapes of regions shown in the drawings, but include changes in shape occurring during manufacturing.

FIG. 1 is a perspective view schematically illustrating an example of an image sensor.

Referring to FIG. 1, an image sensor 100 includes at least one semiconductor substrate 110 and a pixel array unit 120.

The pixel array unit 120 includes a plurality of image sensor pixel arrays 121, 122, . . . , 12n. For example, as illustrated in FIG. 1, the pixel array unit 120 includes at least two image sensor pixel arrays 121 and 122.

Each of the at least two image sensor pixel arrays 121 and 122 includes a plurality of pixels (denoted by Pix in FIG. 1) forming an image sensor.

Characteristics of images obtained by the at least two image sensor pixel arrays 121 and 122 are different. For example, one image sensor pixel array 121 may obtain a black-and-white image, while the other image sensor pixel array 122 may obtain a color image. Also, for example, one image sensor pixel array 121 may obtain an image from a lens having a first angle of view, while the other image sensor pixel array 122 may obtain an image from a lens having a second angle of view that is wider than the first angle of view.

The at least two image sensor pixel arrays 121 and 122 are disposed in a row and spaced apart from one another by a predetermined distance on one surface of the at least one semiconductor substrate 110.

A signal processor 130 is disposed on one surface of the at least one semiconductor substrate 110 and processes an image obtained from the at least two image sensor pixel arrays 121 and 122.

The signal processor 130 includes a plurality of analog signal processors 131 and 132 and a digital signal processor 133.

The plurality of analog signal processors 131 and 132 convert analog signals from the plurality of image sensor pixel arrays 121, 122, . . . , 12n into respective digital signals.

For example, first and second analog signal processors 131 and 132 convert analog signals from corresponding image sensor pixel arrays among at least two image sensor pixel arrays 121 and 122 into digital signals by sampling output voltages of photodiodes of the corresponding image sensor pixel arrays, amplifying the sampled output voltages, and converting the amplified output voltages into digital signals.

A digital signal processor 133 synchronizes the digital signals from the plurality of analog signal processors 131 and 132.

A detailed configuration and operation of the digital signal processor 133 is described below with reference to FIG. 9.

The image sensor 100 having the at least one semiconductor substrate 110, the pixel array unit 120, and the signal processor 130 forms an image sensor chip.

Figure 2A:
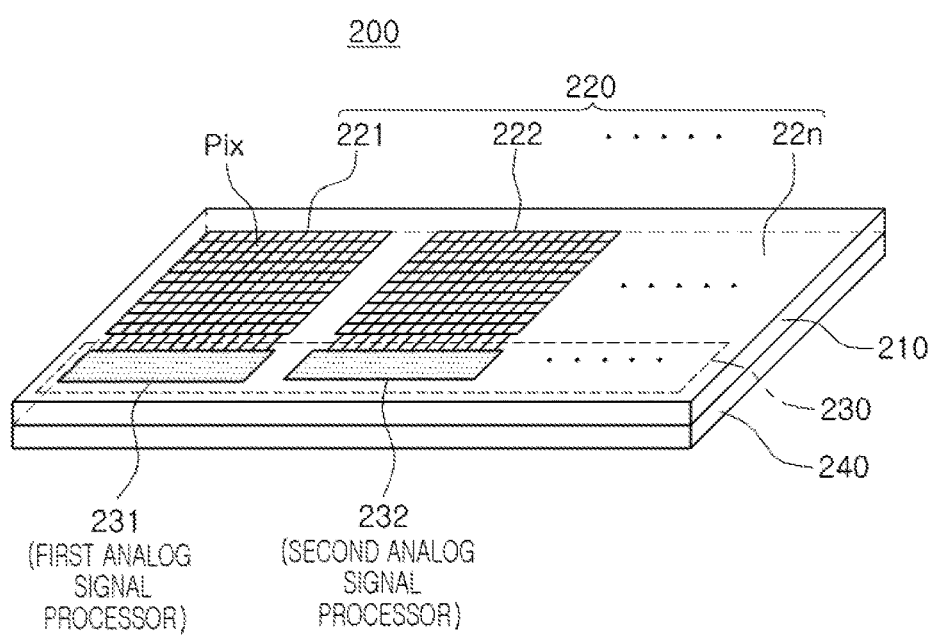
FIG. 2A is a perspective view illustrating a schematic configuration of another example of an image sensor.
Figure 2B:
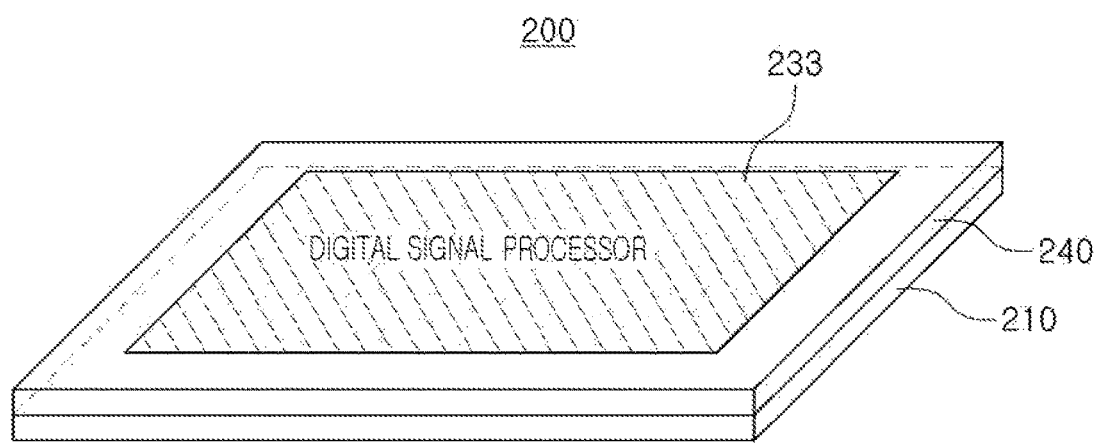
FIG. 2B is a perspective view illustrating a schematic configuration of an example of a lower surface of the image sensor of FIG. 2A.

FIG. 2A is a perspective view illustrating a schematic configuration of a second example of an image sensor, and FIG. 2B is a perspective view illustrating a schematic configuration of an example of a lower surface of the image sensor of FIG. 2A.

Referring to FIGS. 2A and 2B, an image sensor 200 includes one semiconductor substrate 210 and another semiconductor substrate 240 disposed on a lower surface of the one semiconductor substrate 210.

The one semiconductor substrate 210 and the other semiconductor substrate 240 may be electrically connected using through-silicon via (TSV) technique, and may be securely coupled to each other using thermal fusion.

A signal processor 230 of the image sensor 200 includes a plurality of analog signal processors 231 and 232 and a digital signal processor 233. The plurality of analog signal processors 231 and 232 are disposed on one surface of the one semiconductor substrate 210 together with a plurality of image sensor pixel arrays 221, 222, . . . , 22n of a pixel array unit 220, and the digital signal processor 233 is disposed on a lower surface of the other semiconductor substrate 240.

Figure 3:
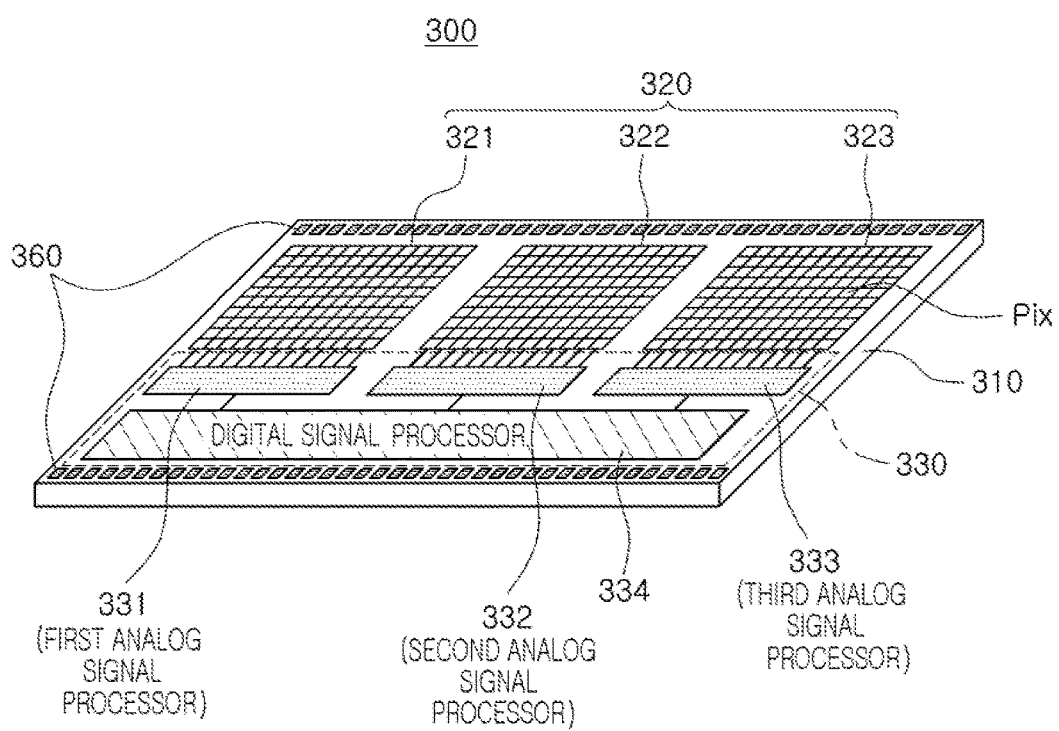
FIG. 3 is a perspective view illustrating a schematic configuration of another example of an image sensor.

FIG. 3 is a perspective view illustrating a schematic configuration of another example of an image sensor.

Referring to FIG. 3, an image sensor 300 includes a single semiconductor substrate 310 and a pixel array unit 320. The pixel array unit 320 includes a first image sensor pixel array 321, a second image sensor pixel array 322, and a third image sensor pixel array 323 disposed in a row and spaced apart from one another by a predetermined distance on one surface of the single semiconductor substrate 310. Pads 360 are disposed on the one surface of the single semiconductor substrate 310 to enable the image sensor 300 to be connected to one or more external devices.

A signal processor 330 is disposed on one surface of the single semiconductor substrate 310 together with the pixel array unit 320, and includes a first analog signal processor 331 converting an image signal from the first image sensor pixel array 321 into a digital signal, a second analog signal processor 332 converting an image signal from the second image sensor pixel array 322 into a digital signal, a third analog signal processor 333 converting an image signal from the third image sensor pixel array 323 into a digital signal, and a digital signal processor 334 synchronizing the digital signals from the first to third analog signal processors 331, 332, and 333.

Figure 4A:
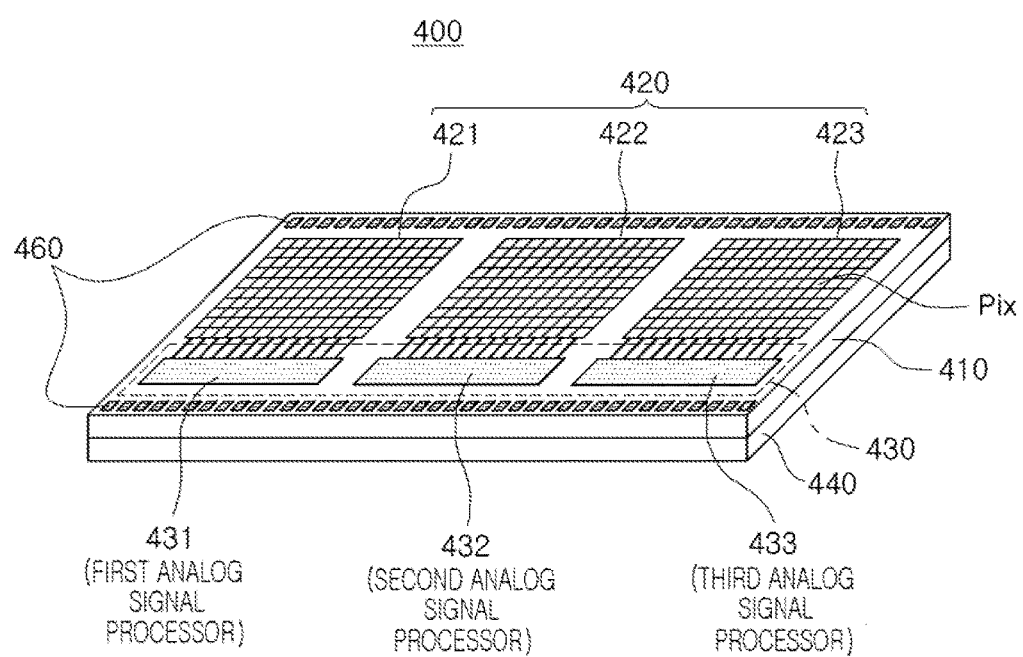
FIG. 4A is a perspective view illustrating a schematic configuration of another example of an image sensor.
Figure 4B:
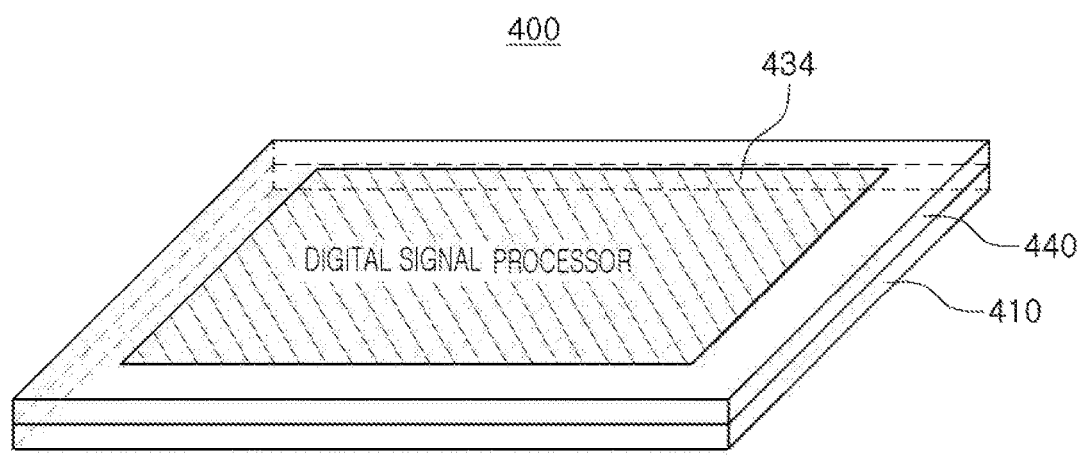
FIG. 4B is a perspective view illustrating a schematic configuration of an example of a lower surface of the image sensor of FIG. 4A.

FIG. 4A is a perspective view illustrating a schematic configuration of another example of an image sensor, and FIG. 4B is a perspective view illustrating a schematic configuration of an example of a lower surface of the image sensor of FIG. 4A.

Referring to FIGS. 4A and 4B, a signal processor 430 of an image sensor 400 includes first to third analog signal processors 431, 432, and 433, and a digital signal processor 434. The first to third analog signal processors 431, 432, and 433 are disposed on one surface of one semiconductor substrate 410 together with first to third image sensor pixel arrays 421, 422, and 423 of a pixel array unit 420, and the digital signal processor 434 is disposed on a lower surface of another semiconductor substrate 440 disposed on a lower surface of the one semiconductor 410. Pads 460 are disposed on the one surface of the one semiconductor substrate 410 to enable the image sensor 400 to be connected to one or more external devices.

FIGS. 5 through 8 are perspective views illustrating schematic configurations of other examples of an image sensor.

Figure 5:
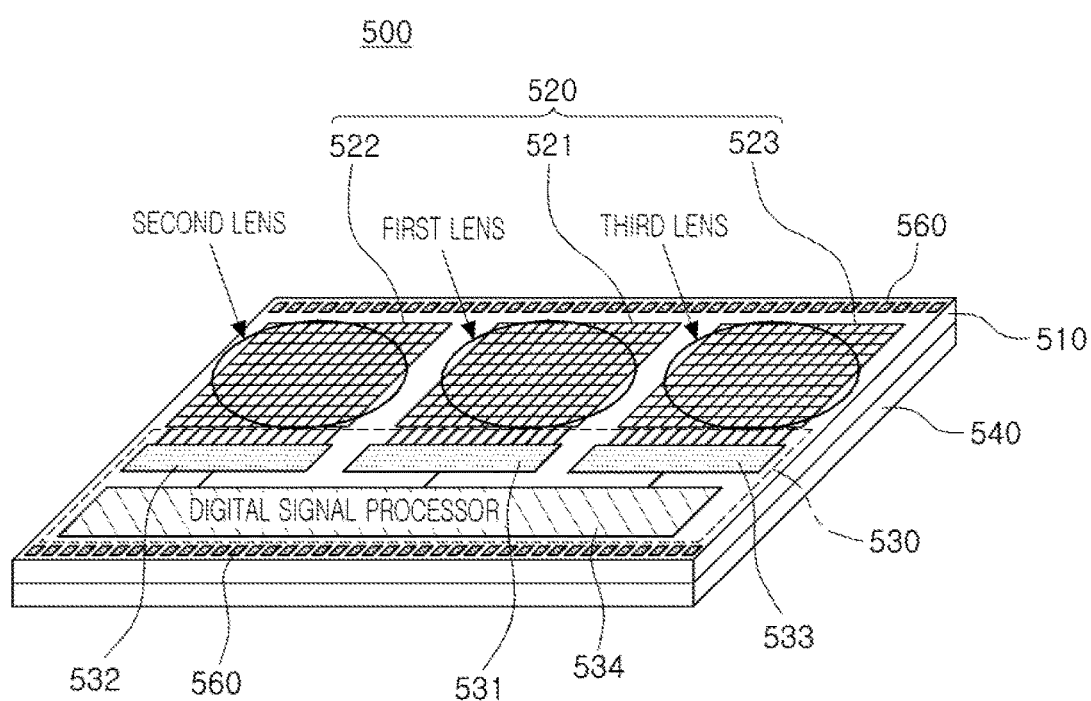
FIGS. 5 through 8 are perspective views illustrating schematic configurations of other examples of an image sensor.

Referring to FIG. 5, an image sensor 500 includes a pixel array unit 520 including first to third image sensor pixel arrays 521, 522, and 523 disposed on one surface of one semiconductor substrate 510. The image sensor 500 further includes a signal processor 530 including a first analog signal processor 531, a second analog signal processor 532, a third analog signal processor 533, and a digital signal processor 534. A configuration of the signal processor 530 is the same as a configuration of the signal processors 130, 230, 330, and 430 described above with reference to FIGS. 1 through 4A and 4B. Another semiconductor substrate 540 is disposed on a lower surface of the one semiconductor substrate 510. In the example illustrated in FIG. 5, the pixel array unit 520 and the signal processor 530 are disposed on one surface of the one semiconductor substrate 510. In another example, the digital signal processor 534 of the signal processor 530 may be disposed on a lower surface of the other semiconductor substrate 540, similar to the examples illustrated in FIGS. 2B and 4B. A detailed description of the signal processor 530 will be omitted, and details will be described with reference to FIG. 9. Pads 560 are disposed on the one semiconductor substrate 510 to enable the image sensor 500 to be connected to one or more external devices.

Referring back to FIG. 5, for example, the first image sensor pixel array 521 is disposed in the center of one surface of the one semiconductor substrate 510, and the second image sensor pixel array 522 and the third image sensor pixel array 523 are disposed on opposite sides of the first image sensor pixel array 521.

Images obtained by the first to third image sensor pixel arrays 521, 522, and 523 have different characteristics.

For example, a first lens concentrating light on the first image sensor pixel array 521 may be a lens of a main camera having an auto-focus function, a second lens concentrating light on the second image sensor pixel array 522 may be a lens of a first sub-camera having an auto-focus function, and a third lens concentrating light on the third image sensor pixel array 523 may be a telephoto lens of a second sub-camera. The first lens and the second lens may have a same focal length and a same angle of view. A focal length of the third lens may be longer than a focal length of the first lens, having a zoom effect of magnifying a small subject area to a high definition. An angle of view of the third lens may be narrower than the angle of view of the first lens.

For example, in a case in which the third lens is a 2× telephoto lens, the focal length of the telephoto lens is twice the focal length of the first lens of the main camera. When images from the main camera and the first sub-camera are combined, an image synthesis technology such as compensation of low light level brightness, improvement of gray level expression in a backlight situation, and realization of high resolution may be advantageously applied. Also, when distance information is calculated using a stereo camera structure of the main camera and the first sub-camera, a distance within a few meters may be detected with high precision, allowing for the realization of an application image technique such as auto-focus using distance information. The use of a combination of the main camera and the second sub-camera allows for the application of a high-definition zoom technology. Since the focal length of the telephoto lens is longer than the focal length of the first lens and the second lens, a height of a module of the second sub-camera is greater than heights of modules of the main camera and the first sub-camera. To minimize the difference in module height, it is necessary to reduce an image sensor pixel array area covered by the telephoto lens relative to an image sensor pixel array area covered by the first lens and the second lens. That is, in a case in which image sensor pixel sizes of the image sensor pixel arrays of the main camera, the first sub-camera, and the second sub-camera are the same, the number of pixels of the image sensor pixel array of the second sub-camera having the telephoto lens needs to be reduced to be smaller than the number of pixels of the image sensor pixel arrays of the main camera having the first lens and the first sub-camera having the second lens. Alternatively, when the image sensor pixel arrays of the main camera, the first sub-camera, and the second sub-camera have the same number of pixels, the image sensor pixel size of the image sensor pixel array of the second sub-camera having the telephoto lens is smaller than the image pixel sizes of the image sensor pixel arrays of the main camera having the first lens and the first sub-camera having the second lens.

Figure 6:
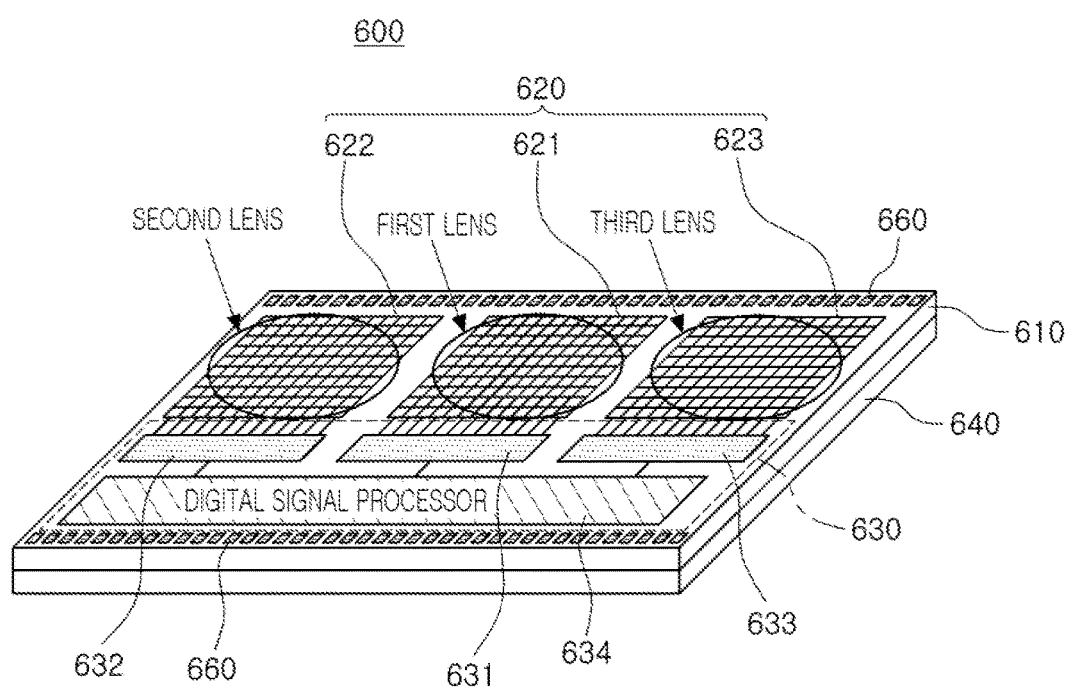

Referring to FIG. 6, an image sensor 600 includes a pixel array unit 620 including first to third image sensor pixel arrays 621, 622, and 623 disposed on one surface of one semiconductor substrate 610. The image sensor 600 further includes a signal processor 630 including a first analog signal processor 631, a second analog signal processor 632, a third analog signal processor 633, and a digital signal processor 634. A configuration of the signal processor 630 is the same as a configuration of the signal processors 130, 230, 330, and 430 described above with reference to FIGS. 1 through 4A and 4B. Another semiconductor substrate 640 is disposed on a lower surface of the one semiconductor substrate 610. In the example illustrated in FIG. 6, the pixel array unit 620 and the signal processor 630 are disposed on one surface of the one semiconductor substrate 610. In another example, the digital signal processor 634 of the signal processor 630 may be disposed on a lower surface of the other semiconductor substrate 640, similar to the examples illustrated in FIGS. 2B and 4B. A detailed description of the signal processor 630 will be omitted, and details will be described with reference to FIG. 9. Pads 660 are disposed on the one surface of the one semiconductor substrate 610 to enable the image sensor 600 to be connected to one or more external devices.

The first image sensor pixel array 621 is disposed in the center of the one surface of the single semiconductor substrate 610, and the second image sensor pixel array 622 and the third image sensor pixel array 623 are disposed on opposite sides of the first image sensor pixel array 621. For example, a first lens concentrating light on the first image sensor pixel array 621 may be a lens of a main camera having both an optical image stabilization (OIS) function and an auto-focus function, a second lens concentrating light on the second image sensor pixel array 622 may be a lens of a first sub-camera having an auto-focus function, and a third lens concentrating light on the third image sensor pixel array 623 may be a telephoto lens of a second sub-camera.

Figure 7:
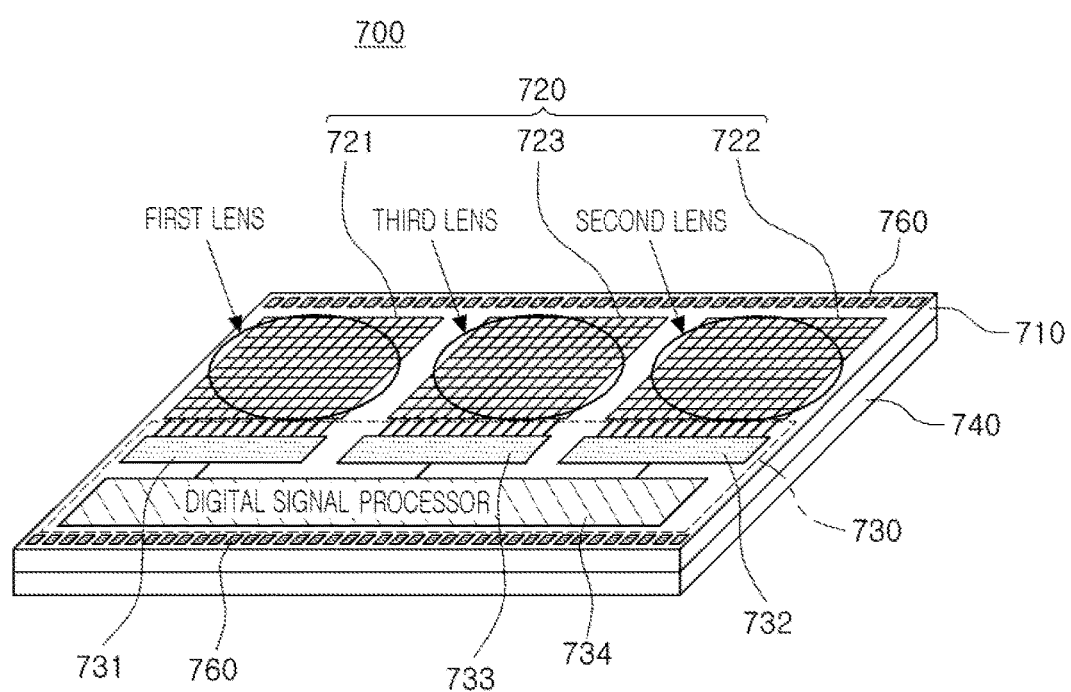

Referring to FIG. 7, an image sensor 700 includes a pixel array unit 720 including first to third image sensor pixel arrays 721, 722, and 723 disposed on one surface of one semiconductor substrate 710. The image sensor 700 further includes a signal processor 730 including a first analog signal processor 731, a second analog signal processor 732, a third analog signal processor 733, and a digital signal processor 734. A configuration of the signal processor 730 is the same as a configuration of the signal processors 130, 230, 330, and 430 described above with reference to FIGS. 1 through 4A and 4B. Another semiconductor substrate 740 is disposed on a lower surface of the one semiconductor substrate 710. In the example illustrated in FIG. 7, the pixel array unit 720 and the signal processor 730 are disposed on one surface of the one semiconductor substrate 710. In another example, the digital signal processor 734 of the signal processor 730 may be disposed on a lower surface of the other semiconductor substrate 740, similar to the examples illustrated in FIGS. 2B and 4B. A detailed description of the signal processor 730 will be omitted, and details will be described with reference to FIG. 9. Pads 760 are disposed on the one surface of the one semiconductor substrate 710 to enable the image sensor 700 to be connected to one or more external devices.

The third image sensor pixel array 723 is disposed in the center of the one surface of the one semiconductor substrate 710, and the first image sensor pixel array 721 and the second image sensor pixel array 722 are disposed on opposite sides of the third image sensor pixel array 723. For example, a first lens concentrating light on the first image sensor pixel array 721 may be a lens of a main camera having an auto-focus function, a second lens concentrating light on the second image sensor pixel array 722 may be a lens of a first sub-camera having an auto-focus function, and a third lens concentrating light on the third image sensor pixel array 723 may be a telephoto lens of a second sub-camera. Focal lengths and angles of view of the first lens and the second lens may be the same. A focal length of the third lens may be longer than the focal length of the first lens, having a zoom effect of magnifying a small subject area to a high definition. An angle of view of the third lens may be narrower than the angle of view of the first lens.

Like the case described above with reference to FIG. 5, for example, in a case in which the third lens is a 2× telephoto lens, a focal length of the telephoto lens is twice the focal length of the first lens of the main camera. When images from the main camera and the first sub-camera are combined, an image synthesis technology such as compensation of low light level brightness, improvement of gray level expression in a backlight situation, and realization of high resolution may be advantageously applied. Also, unlike the case described above with reference to FIGS. 5 and 6, the main camera and the first sub-camera are spaced apart from one another with the second sub-camera having the telephoto lens interposed therebetween (thereby increasing a baseline distance between the main camera and the first sub-camera), and thus a distance to a subject spaced apart by a few meters or more may be advantageously detected. Also, the use of a combination of the main camera having an auto-focus function and the second sub-camera having the telephoto lens allows for the application of high-definition zoom technology.

Figure 8:
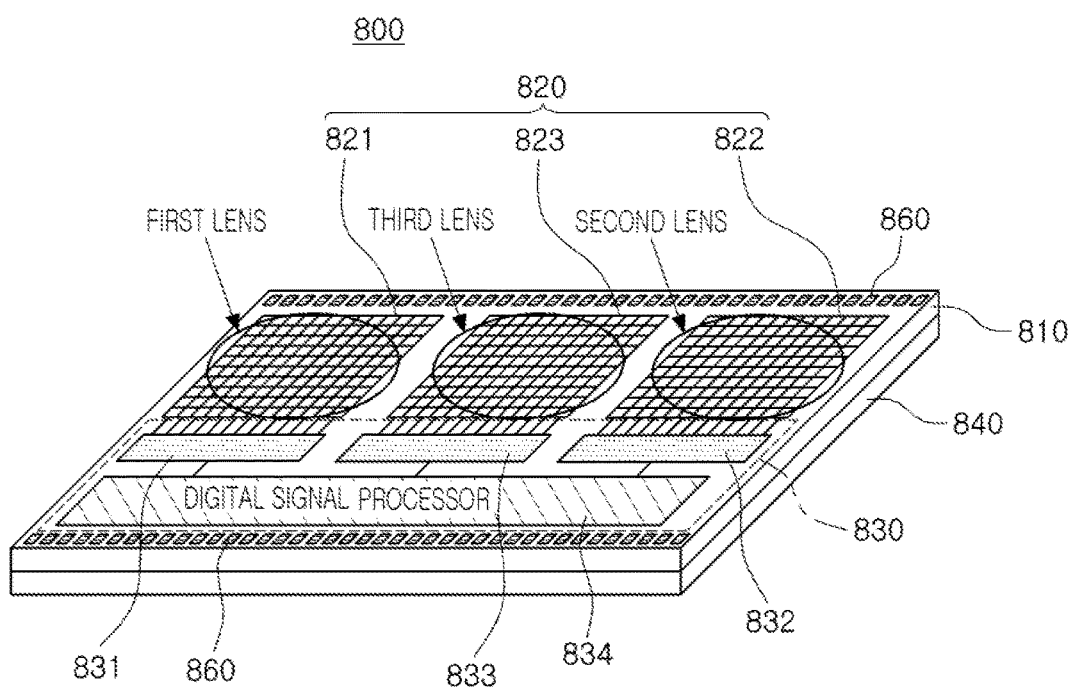

Referring to FIG. 8, an image sensor 800 includes a pixel array unit 820 including first to third image sensor pixel arrays 821, 822, and 823 disposed on one surface of one semiconductor substrate 810. The image sensor 800 further includes a signal processor 830 including a first analog signal processor 831, a second analog signal processor 832, a third analog signal processor 833, and a digital signal processor 834. A configuration of the signal processor 830 is the same as a configuration of the signal processors 130, 230, 330, and 430 described above with reference to FIGS. 1 through 4A and 4B. Another semiconductor substrate 840 is disposed on a lower surface of the one semiconductor substrate 810. In the example illustrated in FIG. 8, the pixel array unit 820 and the signal processor 830 are disposed on one surface of the one semiconductor substrate 810. In another example, the digital signal processor 834 of the signal processor 830 may be disposed on a lower surface of the other semiconductor substrate 840, similar to the examples illustrated in FIGS. 2B and 4B. A detailed description of the signal processor 830 will be omitted, and details will be described with reference to FIG. 9. Pads 860 are disposed on the one surface of the one semiconductor substrate 810 to enable the image sensor 800 to be connected to one or more external devices.

The third image sensor pixel array 823 is disposed in the center of the one surface of the single semiconductor substrate 810, and first image sensor pixel array 821 and the second image sensor pixel array 822 and are disposed on opposite sides of the third image sensor pixel array 823. For example, a first lens concentrating light on the first image sensor pixel array 821 may be a lens of a main camera having both an optical image stabilization (OIS) function and an auto-focus function, a second lens concentrating light on the second image sensor pixel array 822 may be a lens of a first sub-camera having an auto-focus function, and a third lens concentrating light on the third image sensor pixel array 823 may be a telephoto lens of a second sub-camera.

In FIGS. 5 through 8, the first image sensor pixel array may be a pixel array of a color image sensor in an RGB Bayer format, and the second and third image pixel arrays may be pixel arrays of a black-and-white image sensor in a mono format. Alternatively, the second and third image pixel arrays may be pixel arrays of a color image sensor in an RGB Bayer format, rather than pixel arrays of a black-and-white image sensor in a mono format.

Figure 9:
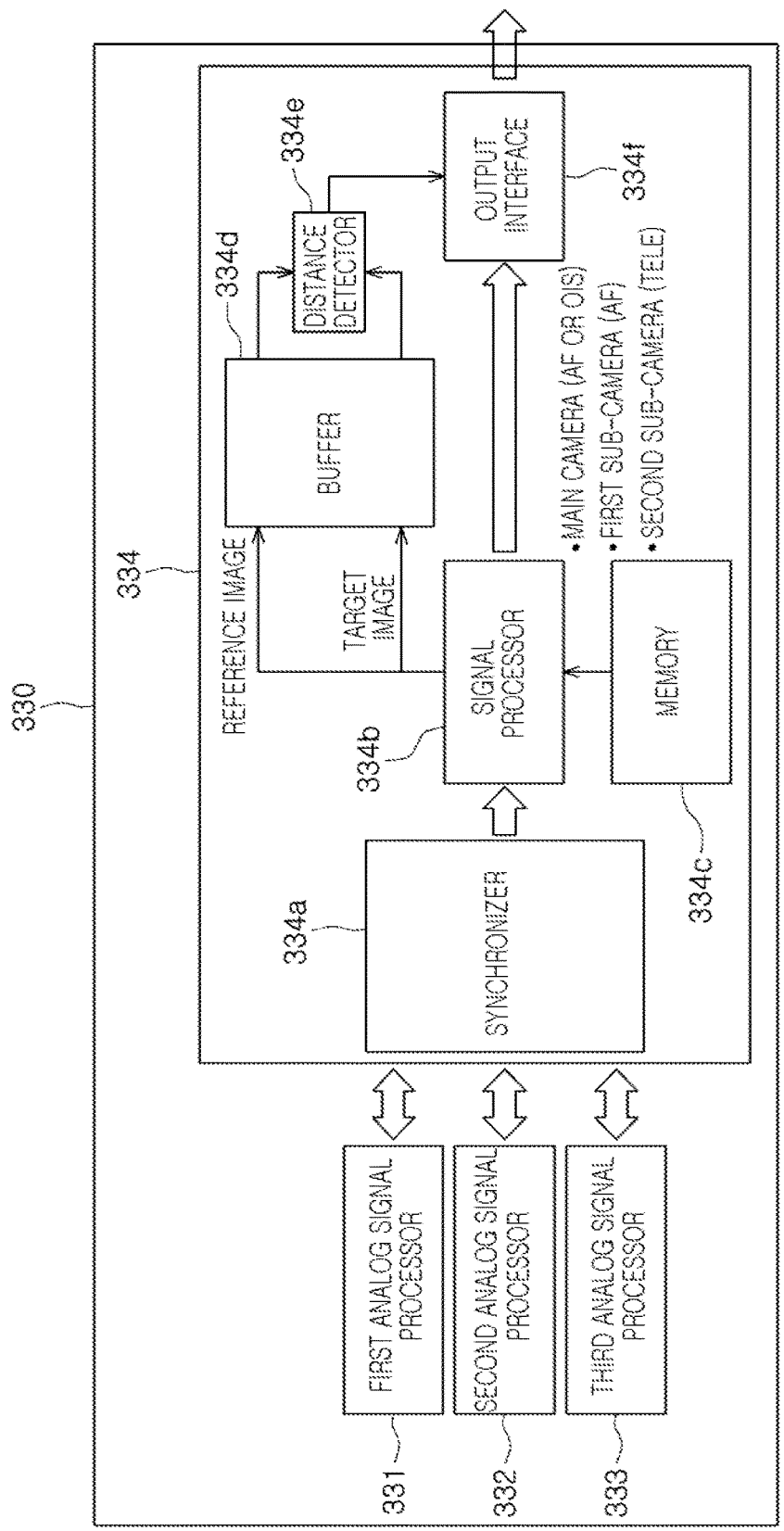
FIG. 9 is a block diagram illustrating a schematic configuration of an example of a signal processor employed in an image sensor.

FIG. 9 is a block diagram illustrating a schematic configuration of an example of a digital signal processor employed in an image sensor.

Referring to FIG. 9, a digital signal processor 334 employed in an image sensor includes a synchronizer 334a, a signal processor 334b, a memory 334c, a buffer 334d, a distance detector 334e, and an output interface 334f. FIG. 9 has been described with reference to the digital signal processor 334 in FIG. 3, but the description is also applicable to the digital signal processors 133, 233, 434, 534, 634, 734, and 834 in FIGS. 1, 2B, 4B, and 5-8.

The synchronizer 334a receives image signals from a plurality of image sensor pixel arrays, and the image signals are analog signals that have been converted into digital signals by analog signal processors 331, 332, and 333 respectively connected to the plurality of image sensor pixel arrays.

The synchronizer 334a controls the start and the end of an exposure time of each of the plurality of image sensor pixel arrays to be the same, and performs line synchronization and frame synchronization to obtain synchronized images from the plurality of image sensor pixel arrays.

That is, the same lines of the image sensor pixel arrays start to be exposed and end being exposed at the same time, and the same lines are read at the same time and transmitted to the signal processor 334b, by the synchronizer 334a. To adjust frame synchronization of the image sensor pixel arrays, the synchronizer 334a performs a control function for frame synchronization. For example, after lines of each of three image sensor pixel arrays are read, when a portion of lines among lines of the three image sensor pixel arrays is not synchronized, the synchronizer adjusts line synchronization among the three image sensor pixel arrays using a line blanking section. For example, after all the lines of each of the image sensor pixel arrays are read, when a portion of the three image sensor pixel arrays is not in frame synchronization, a blanking line is added or deleted to adjust frame synchronization among the three image sensor pixel arrays.

The signal processor 334b performs image alignment using a synchronized reference image and a target image.

The memory 334c may be a one-time programmable (OTP) memory and records a rotation amount of pitch, yaw, and roll and an image shift amount of X, Y, and Z axes of a target image relative to a reference image needed in an image alignment process as calibration values during a calibration process. The calibration values stored in the memory 334c are used by the signal processor 334b during an image alignment calculation process. The rotation amount and the image shift amount are functions of the configuration of the cameras on the semiconductor substrate. Due to manufacturing tolerances in forming the image sensor pixel arrays and mounting the lenses to form the cameras, differences in rotation and position between the cameras may occur. The calibration values reflect these differences in rotation and position between the cameras.

As described above, the signal processor 334b outputs the reference image and the target image, and the buffer 334d buffers frames of the reference image and the target image and outputs the buffered frames to the distance detector 334e.

The distance detector 334e detects distance information using the aligned reference image and the target image, and information output through the output interface 334f includes distance information mapped together with a total of three images including an image (AF or OIS) of the main camera and images (AF and Tele) of the first and second sub-cameras. For example, the image AF or OIS of the main camera is output using a first mobile industry processor interface (MIPI) port, the image AF of the first sub-camera is output using a second MIPI port, and the image Tele of the second sub-camera is output using a third MIPI port. The distance information map may be included in an MIPI virtual channel of any one of the three ports and output.

Figure 10:
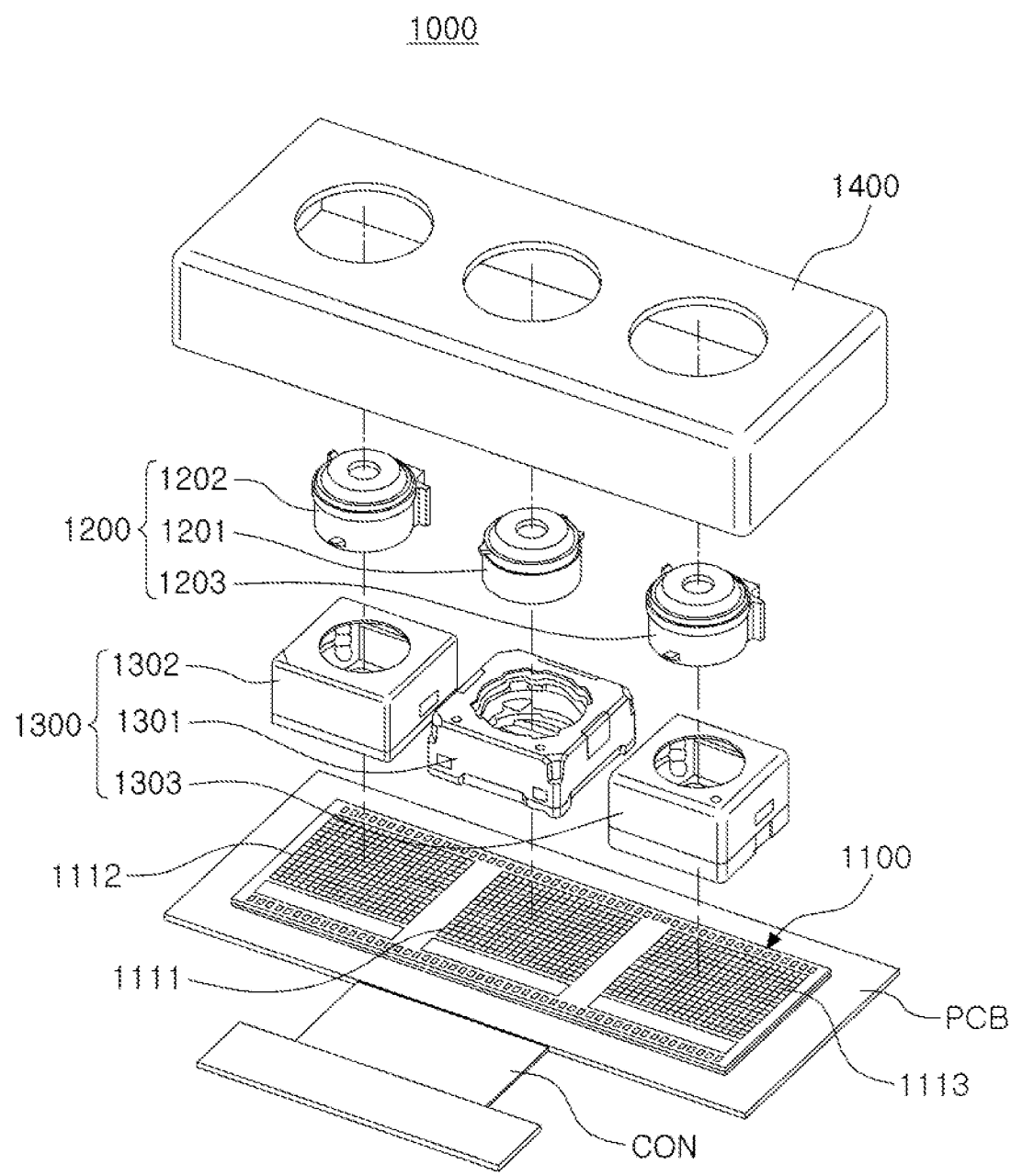
FIG. 10 is an exploded perspective view illustrating a schematic configuration of an example of a camera module.
Figure 11:
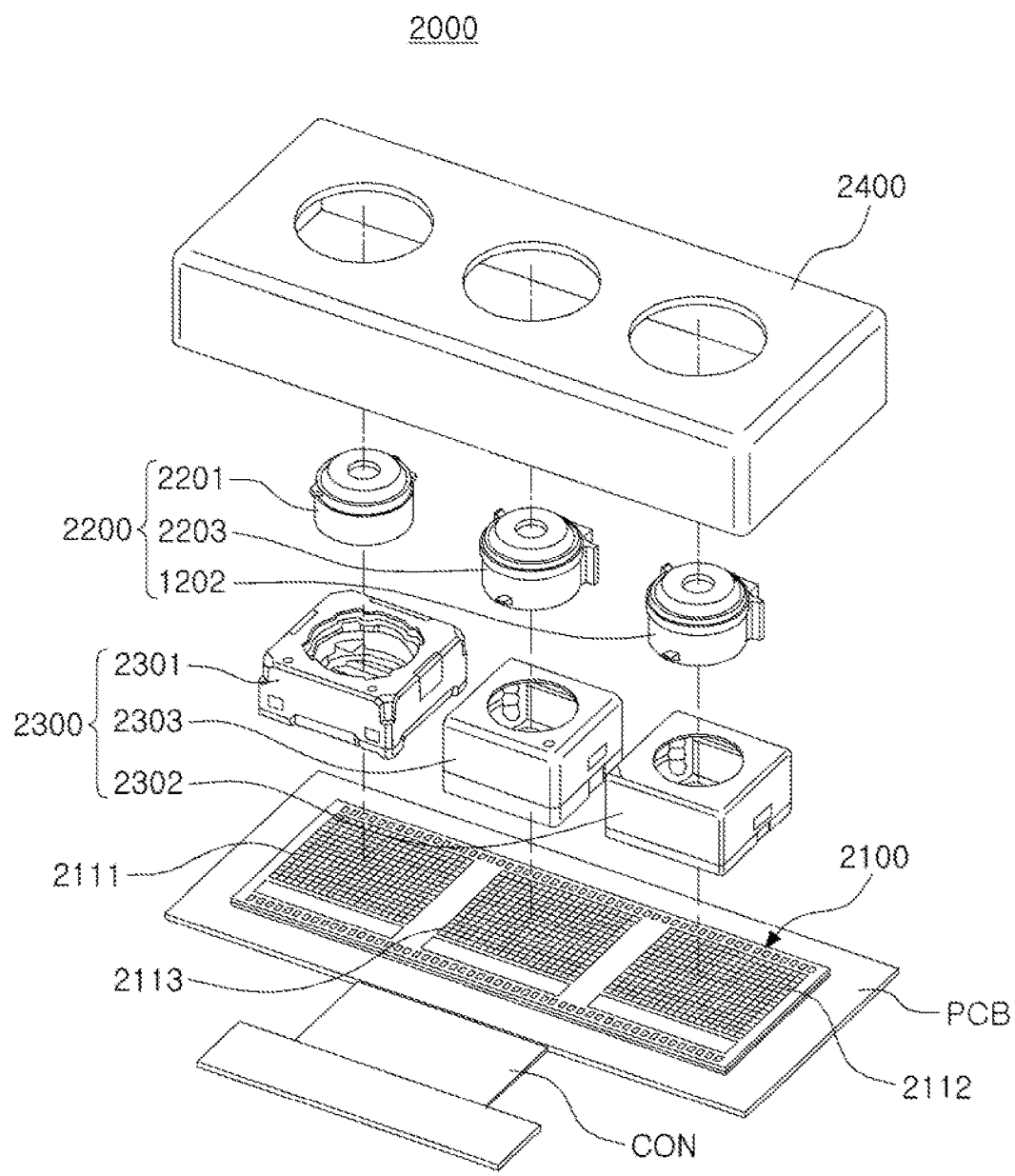
FIG. 11 is an exploded perspective view illustrating a schematic configuration of another example of a camera module.

FIG. 10 is an exploded perspective view illustrating a schematic configuration of an example of a camera module, and FIG. 11 is an exploded perspective view illustrating a schematic configuration of another example of a camera module.

Referring to FIG. 10, in a camera module 1000, an image sensor 1100 is mounted on a printed circuit board (PCB), and the PCB includes a connector part CON provided at one side thereof and electrically connected to a host (not shown).

The camera module 1000 includes a lens module 1200 coupled to the image sensor 1100 to form a camera and an actuator holder group 1300.

As described above with reference to FIGS. 5 and 6, in the image sensor 1100, a first image sensor pixel array 1111 is disposed in the center of one surface of a semiconductor substrate and a second image sensor pixel array 1112 and a third image sensor pixel array 1113 are disposed on opposite sides of the first image sensor pixel array 1111.

A main actuator holder 1301 to which a main lens assembly 1201 is coupled is mounted on the first image sensor pixel array 1111, a first sub-actuator holder 1302 to which a first sub-lens assembly 1202 is coupled is mounted on the second image sensor pixel array 1112, and a second sub-actuator holder 1303 to which a second sub-lens assembly 1203 is coupled is mounted on the third image sensor pixel array 1113.

As described above with reference to FIGS. 5 and 6, the main lens assembly 1201 concentrating light on the first image sensor pixel array 1111 may be a lens assembly of a main camera having an auto-focus function, the first sub-lens assembly 1202 concentrating light on the second image sensor pixel array 1112 may be a lens assembly of a first sub-camera having an auto-focus function, and the second sub-lens assembly 1203 concentrating light on the third image sensor pixel array 1113 may be a telephoto lens assembly of a second sub-camera. Alternatively, the main lens assembly 1201 may be a lens assembly of the main camera having both an OIS function and an auto-focus function, the first sub-lens assembly 1202 may be a lens assembly of the first sub-camera having an OIS function, and the second sub-lens assembly 1203 may be a lens assembly of the second sub-camera having an OIS function or an auto-focus function.

The actuator holders may be mounted on the image sensor pixel arrays using a thermal adhesive.

A bracket 1400 is formed of a metal resistant to thermal deformation and serves to firmly fix the three actuator holders 1301, 1302, and 1303 at corresponding positions.

In a dual-camera or multi-camera application field, it is very important to align images of two or more cameras, and since the image sensor pixel arrays 1111, 1112, and 1113 are manufactured on a silicon substrate using the same mask, it may be expected that alignment of the image sensor pixel arrays may be achieved at a level of a few μm precision. However, when the actuator holders 1301, 1302, and 1303 are mounted on the image sensor pixel arrays 1111, 1112, and 1113, the cameras may be fixed at positions such that a spacing therebetween is different from a design spacing and the cameras may have different tilts. In a case in which a multi-camera module is additionally installed within a smartphone, a spacing between the cameras or tilts of the cameras may be different from those in the initial installation positions due to external stress or heat. Thus, to minimize such a deformation, it is necessary to firmly fix the cameras in the initial installation positions using the metal bracket 1400.

Referring to FIG. 11, in a camera module 2000, an image sensor 2100 is mounted on a PCB, and the PCB includes a connector part CON provided on one side thereof and electrically connected to a host (not shown).

The camera module 2000 includes a lens module 2200 coupled to the image sensor 2100 to form a camera and an actuator holder group 2300.

As described above with reference to FIGS. 7 and 8, in the camera module 2000, a third image sensor pixel array 2113 is disposed in the center of one surface of a semiconductor substrate, and a first image sensor pixel array 2111 and a second image sensor pixel array 2112 are disposed on opposite sides of the third image sensor pixel array 2113.

A main actuator holder 2301 to which a main lens assembly 2201 is coupled is mounted on the first image sensor pixel array 2111, a first sub-actuator holder 2302 to which a first sub-lens assembly 2202 is coupled is mounted on the second image sensor pixel array 2112, and a second sub-actuator holder 2303 to which a second sub-lens assembly 2203 is coupled is mounted on the third image sensor pixel array 2113.

As described above with reference to FIGS. 7 and 8, the main lens assembly 2201 concentrating light on the first image sensor pixel array 2111 may be a lens assembly of a main camera having an auto-focus function, the first sub-lens assembly 2202 concentrating light on the second image sensor pixel array 2112 may be a lens assembly of a first sub-camera having an auto-focus function, and the second sub-lens assembly 2203 concentrating light on the third image sensor pixel array 2113 may be a telephoto lens assembly of a second sub-camera. Alternatively, the main lens assembly 2201 may be a lens assembly of the main camera having both an OIS function and an auto-focus function, the first sub-lens assembly 2202 may be a lens assembly of the first sub-camera having an OIS function, and the second sub-lens assembly 2203 may be a lens assembly of the second sub-camera having an OIS function or auto-focus function.

Similar to the case of FIG. 10, in order to minimize deformation of a spacing between cameras or a tilt of cameras, the cameras may be firmly fixed to mounting positions of the PCB using a bracket 2400 formed of a metal resistant to thermal deformation.

In addition, both the main camera and the first sub-camera may have both an OIS function and an auto-focus function.

In the camera modules described above, images are respectively output from three image sensor pixel arrays to a host in an image synthesis mode, and in an application needing outputs of two camera modules having the same angle of view, such as compensation of low light level brightness, improvement of gray level expression in a back-light situation, and the realization of high resolution, an output of the main camera having an auto-focus function or both an OIS function and an auto-focus function and an output of the first sub-camera having an auto-focus function or both an OIS function and an auto-focus function are used. On the other hand, in a zoom mode in which outputs of two camera modules having different angles of view are needed, a host switches from an image of the first sub-camera to an image of the second sub-camera and uses the image of the second sub-camera so that an output of the main camera having an auto-focus function or both an OIS function and an auto-focus function and an output of the second sub-camera having the telephoto lens assembly may be used.

In a case in which the host sets a current consumption saving mode for operation, only the main camera may be set to be operated, while the first and second cameras may be set to be in standby mode.

The examples described above include an image sensor structure capable of minimizing image alignment calculation between two cameras needed for image synthesis in realizing an application technology using a multi-camera setup.

The image sensor in the examples described above is manufactured through a semiconductor process using the same mask for a plurality of cameras, and making it possible to achieve a level of precision of a few μm in a vertical direction. Also, this makes it possible to achieve a level of precision of a few μm in a baseline (a spacing) between the centers of the image sensor pixel arrays, a major parameter in distance detection calculations.

In addition, this makes it possible to control image rotation between image sensor pixel arrays with a level of precision of a few minutes, so image rotation compensation typically needed in an image synthesis technology (compensation of low light level brightness, improvement of gray level expression in a backlight situation, realization of high resolution, and distance detection) using images output by two camera modules may be neglected.

The image sensor in the examples described above includes a synchronizer, and thus starts and ends of exposure times of three different image sensor pixel arrays may be the same, and making it possible to easily achieve line synchronization and frame synchronization. Also, since the synchronizer is provided, a delay time for a host to adjust frame synchronization is eliminated, which is advantageous for a real-time image synthesis process, and even when a scene in which a subject is moving is imaged, a side effect such as motion blur that may occur during an image synthesis process does not occur.

The image sensor in the examples described above performs image alignment using a reference image and a target image during synchronization and subsequently performs distance detection therein using the aligned images, and thus an additional calculation time needed for aligning images or detecting a distance by a host application processor (AP) may be reduced or eliminated. As a result, a calculation load of the host AP may be reduced to reduce current consumption.

The image sensor in the examples described above may have an OTP memory that stores a rotation amount of pitch, yaw, and roll and an image shift amount of X, Y, and Z axes of a target image relative to a reference image needed in an image alignment process as calibration values during a calibration process. A signal processor directly accesses and uses the calibration values stored in the OTP during an image alignment calculation process, eliminating the necessity of a separate external memory.

In the examples described above, optical axis alignment may be facilitated, image quality may be improved, and a high-definition zoom function may be realized.

The first analog signal processors 131, 231, 331, 431, 531, 631, 731, and 831, the second analog signal processors 132, 232, 332, 432, 532, 632, 732, and 832, the third analog signal processor 333, 433, 533, 633, 733, and 833, the digital signal processors 133, 233, 334, 434, 534, 634, 734, and 834, the synchronizer 334a, the signal processor 334b, the memory 334c, the buffer 334d, the distance detector 334e, and the output interface 334f in FIGS. 1-9 that perform the operations described herein with respect to FIGS. 1-9 are implemented by hardware components. Examples of hardware components include controllers, sensors, generators, drivers, memories, comparators, arithmetic logic units, adders, subtractors, multipliers, dividers, integrators, samplers, amplifiers, analog-to-digital converters, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-9. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components as described above are written as computer programs, code segments, instructions or any combination thereof, for individually or collectively instructing or configuring the processor or computer to operate as a machine or special-purpose computer to perform the operations performed by the hardware components as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components as described above.

The instructions or software to control a processor or computer to implement the hardware components as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magnetooptical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image sensor comprising:
   a substrate; and
   a plurality of image sensor pixel arrays configured to obtain images having different characteristics;
   wherein the plurality of image sensor pixel arrays are disposed in a row and spaced apart from one another by a predetermined distance on one surface of the substrate;
   the plurality of image sensor pixel arrays comprise:
      an image sensor pixel array configured to obtain an image from a lens having a first angle of view; and
      an image sensor pixel array configured to obtain an image from a lens having a second angle of view wider than the first angle of view;
   the image sensor pixel array configured to obtain the image from the lens having the second angle of view wider than the first angle of view is a first image sensor pixel array;
   the plurality of image sensor pixel arrays further comprise a second image sensor pixel array;
   the image sensor pixel array configured to obtain the image from the lens having the first angle of view is a third image sensor pixel array;
   the second image sensor pixel array and the third image sensor pixel array are disposed on opposite sides of the first image sensor pixel array, or the first image sensor pixel array and the second image sensor pixel array are disposed on opposite sides of the third image sensor pixel array;
   the first image sensor pixel array is configured to obtain an image from a main camera lens;
   the second image sensor pixel array is configured to obtain an image from a first sub-camera lens; and
   the third image sensor pixel array is configured to obtain an image from a second sub-camera lens.

2. The image sensor of claim 1, wherein the main camera lens is an auto-focus lens;
   the first sub-camera lens is an auto-focus lens having a same focal length and a same angle of view as the main camera lens; and
   the second sub-camera lens is a telephoto lens having a focal length longer than a focal length of the main camera lens and an angle of view narrower than an angle of view of the main camera lens.

3. The image sensor of claim 2, wherein the main camera lens is an optical image stabilization (OIS) auto-focus lens, the first sub-camera lens is an auto-focus lens, and the second sub-camera lens is an optical image stabilization (OIS) lens or an auto-focus lens.

4. The image sensor of claim 1, further comprising a signal processor disposed on the one surface of the substrate and configured to process images obtained from the plurality of image sensor pixel arrays.

5. The image sensor of claim 4, wherein the signal processor comprises:
   a plurality of analog signal processors configured to convert analog signals from respective ones of the plurality of image sensor pixel arrays into respective digital signals; and
   a digital signal processor configured to synchronize the digital signals.

6. The image sensor of claim 5, wherein the digital signal processor is further configured to adjust a line synchronization and a frame synchronization of a corresponding image sensor pixel array of each of the plurality of analog signal processors to synchronize the digital signals to obtain synchronized images from the plurality of image sensor pixel arrays; and
   the digital signal processor comprises a distance detector configured to detect distance information from the synchronized images of the plurality of image sensor pixel arrays.

7. The image sensor of claim 1, further comprising:
   another substrate disposed on another surface of the substrate; and
   a signal processor configured to process images obtained from the plurality of image sensor pixel arrays;
   wherein the signal processor comprises:
      a plurality of analog signal processors disposed on the one surface of the substrate and configured to convert analog signals from respective ones of the plurality of image sensor pixel arrays into respective digital signals; and
      a digital signal processor disposed on an exposed surface of the other substrate and configured to synchronize the digital signals;
   the digital signal processor is further configured to adjust respective line synchronizations and frame synchronizations of the image sensor pixel arrays of the plurality of analog signal processors to coincide with each other to synchronize the digital signals to obtain synchronized images from the plurality of image sensor pixel arrays; and
   the digital signal processor comprises a distance detector configured to detect distance information from the synchronized images of the plurality of image sensor pixel arrays.

* * * * *